July 6, 1926.

R. MARSLAND

METHOD OF BALANCE

Filed March 3, 1923

1,591,855

WITNESSES:

R. Marsland
INVENTOR

BY
ATTORNEY

Patented July 6, 1926.

1,591,855

UNITED STATES PATENT OFFICE.

ROLAND MARSLAND, OF ESSINGTON, PENNSYLVANIA, ASSIGNOR TO WESTINGHOUSE ELECTRIC AND MANUFACTURING COMPANY, A CORPORATION OF PENNSYLVANIA.

METHOD OF BALANCE.

Application filed March 3, 1923. Serial No. 622,615.

My invention relates to a method for varying the distribution of mass at the ends of a rotary body to secure static and dynamic balance thereof. More specifically, my invention consists in varying the distribution of mass at a free end of the body in order to neutralize the unbalancing moment with respect to a fixed end and then in freeing the first fixed end and fixing the second or free end and then in varying the distribution of mass at both ends so as not to disturb the first condition of neutralization and to effect a neutralization of the unbalancing moment with respect to the second fixed end.

A further object of my invention is to provide a rotor which is balanced by three weights, two weights being at one end of the rotor and one weight being at the other end, one of the two weights at one end of the rotor being spaced 180° from the weight at the other end of the rotor. If desired, a single resultant weight may replace the two weights determined for one end of the rotor.

Figures 1, 3:
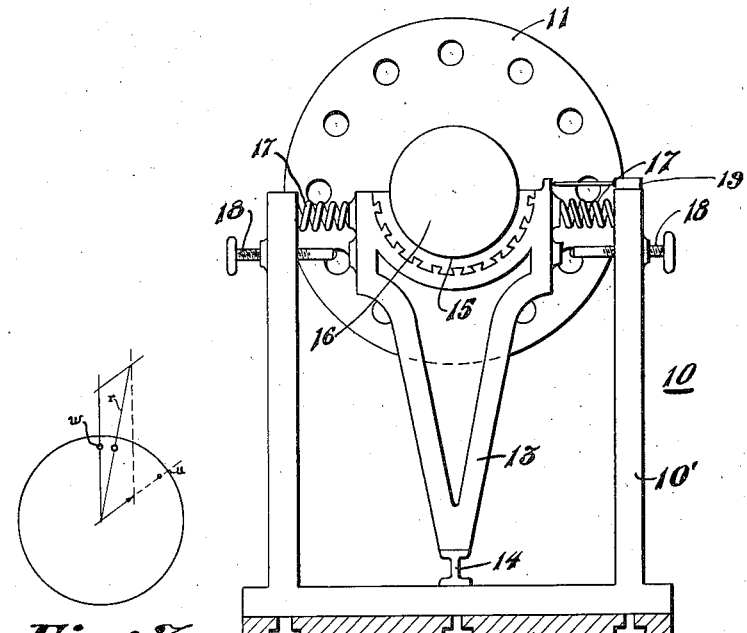
Figure 2:
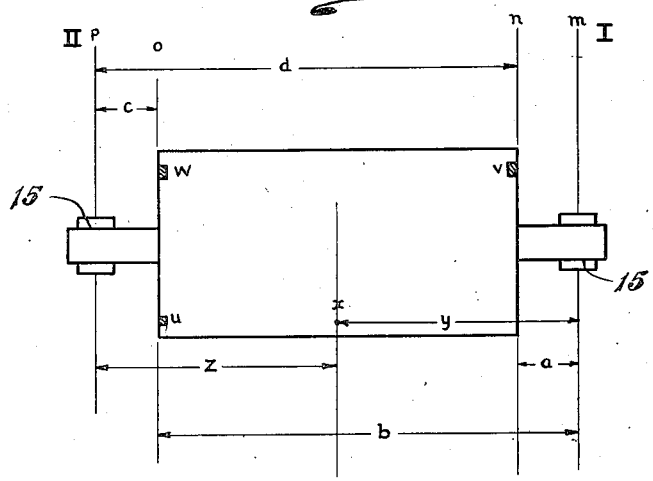

Reference is made to the attached drawings for a better understanding of my invention, in which Fig. 1 is an end elevation of a balancing machine of the type to which my method is applicable; Fig. 2 is a diagrammatic view to illustrate mathematically my improved process of balancing; and Fig. 3 is a vector diagram showing how a resultant of two weights for one rotor end may be determined.

The type of balancing machine to which my method of balancing is applicable is illustrated in Fig. 1. This type of machine consists of balancing supporting structures, at 10, for the ends of a body 11 to be placed in balance; and the structures, at 10, are carried by a suitable bed plate 12. Each structure, at 10, consists of a frame or pedestal element 10', adjustable with respect to the bed plate 12 in order to accommodate rotors 11 of different lengths and which supports a vibratory pendulum 13 by any suitable means permitting of vibration of the pendulum about its lower end, as by means of a flexible I-beam structure 14. Each pendulum 13 is provided with a bearing 15 at its free end to receive a journal portion 16 of the body to be placed in balance. Springs 17 are arranged between the pendulum and pedestal structures in order to secure resonance of vibration in a manner well understood in the art, and screws 18 are carried by the pedestal structures so that the pendulums 13 may be held firmly in fixed positions whenever necessary in the operation of balancing.

With the type of balancing machine referred to, when a body is balanced, one pendulum 13 is fixed by means of the screws 18 while the other pendulum is left free to vibrate. If the body 11 is unbalanced statically or dynamically, when it is rotated, the free pendulum 13 vibrates, the extent of the vibrations being observable by means of a suitable indicator 19. The position and magnitude of unbalance is determined and the distribution of mass at the free end of the body is modified until vibrations of the pendulum referred to are eliminated. The free pendulum is then fixed, and the first fixed pendulum is then freed and the mass of the rotor undergoes such distribution at the ends thereof as to eliminate vibration at the second free end without disturbing the first state of neutralization or balance already secured.

Since the supporting bearings 15 are spaced apart from the balancing ends of a rotor, the planes containing the axes of vibration do not coincide with the balancing planes of the rotor and consequently the condition of mass distribution at each end of the rotor which results in the elimination of vibrations with one end fixed would not result in placing the body in static and dynamic balance. Heretofore, it has been necessary to resort to complicated mathematical processes in order to determine the positions and the magnitudes of the masses to be added to the ends of the rotor to secure a state of dynamic and static balance.

In accordance with my invention, I provide an improved method, whereby, with a first end of the body fixed, a weight is added to the second or vibratory end at a position and of sufficient magnitude to eliminate vibration of the second end. Thereafter, the first end of the machine is freed and the second end is fixed. Weights are then added to both ends of the rotor at positions 180° apart and of such relative magnitudes as to eliminate vibration at the first end without disturbing the state of balance already secured by the weight added at the second end. Having determined the position for adding mass to the second end, then in accordance with my improved method, it is necessary to add masses to the first end and to the second end, 180° apart and in the ratio of the distance of the balance plane of the second end from the plane of the vibration axis at the first end to the distance of the balance plane of the first end from the plane of the vibration axis at the first end to counterbalance the moment of unbalance with respect to the second end without disturbing the counterbalancing or neutralizing of the moment of unbalance with respect to the first end secured by the addition of the weight to the second end, as already referred to.

In Fig. 2, the median planes of the bearings 15, which are the planes containing the axes of vibration, are indicated at $m$ and $p$; and the planes containing the balance openings, or the planes for the distribution of mass, at the ends of the rotor are indicated at $n$ and $o$. The distances between the balancing planes and the planes of the vibration axes are indicated by the lines $a$, $b$, $c$ and $d$.

In accordance with my invention, one end of a rotor, for example, the end, at I, in Fig. 2, is fixed while the end, at II, is free to vibrate. A weight $w$ is added to the free end II of the rotor of sufficient magnitude and at such a location as to eliminate vibration. Then the end of the rotor, at II, is fixed or restrained and the end at I is freed for vibration, and weights are added to both ends of the rotor, a weight $v$ being added to the end, at I, and a weight $u$ added to the end, at II, these weights being spaced apart 180°, and the weight $u$ being located in such a position at the end II as to oppose vibration at that end. In accordance with my method, a body may be placed in static and dynamic balance by the use of only three weights, the first weight being added at the end II with the end I fixed, and the second and third weights are added to the ends I and II respectively, the third weight at the end II being spaced 180° from the second weight at the end I; and, as pointed out, the second and third weights are in the inverse ratio of the distances of the balance planes to median plane of the bearing at I. The first and third weights may be combined and a single weight added to the end II.

Assuming that the rotor indicated in Fig. 2 has an unbalancing mass at $x$, then with the end at I fixed and the end at II free, vibration will be eliminated when the moments of the weight $w$ and of the unbalance $x$ with respect to the vibration axis at I are equal, that is, when $wb=xy$. Since $b$ is greater than $y$, the moment $wc$ with respect to the axis at II is less than the moment $xz$ with respect to that axis. Therefore, the moment $xz$ minus the moment $wc$ is equal to the unbalanced moment M of the body with respect to the vibration axis at II, after the weight $w$ is added. Having fixed the end of the rotor, at II, and freed the end, at I, for vibration, the body is set in rotation and the proper position for the addition of the balancing mass at the end I is determined. However, if a mass is added at the end I only, it will be apparent that the condition of equilibrium of moments with respect to the axis of vibration at I will be disturbed unless a counter-opposing moment is brought into play. Hence, if a mass $v$ is added to the end I of the rotor a mass $u$ must be added to the end at II and 180° from the position of $v$ in order to avoid disturbance of the state of equilibrium already attained with respect to the axis at I by the addition of the weight $w$. In other words, the moment $va$ minus the moment $ub$ should be equal to zero in order to avoid disturbance of the relation $wb$ minus $xy$ is equal to zero. The weights $v$ and $u$ should have such a relation that the moment $vd$ minus the moment $uc$ is equal to the moment $xz$ minus the moment $wc$ which is equal to the unbalancing moment M with respect to the end II, as already referred to. From this relation, it will be apparent that the weights $v$ and $u$ are in the ratio of the moment arm $b$ to the moment arm $a$. In other words, if weight $v$ is to be added to the end I, a weight equal to $v$ times $\frac{a}{b}$, should be added to the end II and 180° from the weight $v$.

The step of determining the weights $v$ and $u$ to be added to the ends of the rotor may be simplified by utilizing the following algebraic solution:

With the weight $w$ added as before indicated, the end II fixed and the end I freed for vibration, a mass $v'$ is added to the end I at such a position as to eliminate vibration; and, from the magnitude of this mass $v'$, the values of the permanent weights $v$ and $u$ are to be determined. This may be done from the following simultaneous equations of moments:

(1) $va-ub=0$
(2) $vd-uc=v'd$

The first equation is expressive of the condition that the weights $u$ and $v$ shall not disturb the balanced moments $wb$ and $xy$. The second equation will be apparent when it is considered that the moment $v'd$ has effected an equilibrium condition about the axis, at II, which is the state to be effected by the moments $vd$ and $uc$. In other words, the moment $v'd$ must be equal to $vd$ minus $uc$.

From (1), $u$ is equal to $\dfrac{va}{b}$

Hence, substituting this value of $u$ in (2), $$vd - \dfrac{va}{b}c = v'd$$

From which $$v = \dfrac{v'd}{\left(d - \dfrac{ac}{b}\right)}$$

In like manner, solving for $u$, $u$ is found to be equal to $$u = \dfrac{v'd}{\left(\dfrac{bd}{a} - c\right)}$$

Since the mass $v'$ and the distances $a$, $b$, $c$ and $d$ are known, it is an easy matter, with these equations, to solve for the correct values of masses $v$ and $u$ to be added to the ends I and II of the rotor.

There is still another method of balancing by the use of three weights which is simpler from an operative standpoint. A weight $w$ is added to the end at II of the rotor as heretofore and then a weight $v'$ sufficient to eliminate vibration is determined for the other end of the rotor when the end II is fixed, the end I is freed, and the rotor is rotated. The addition of such a mass $v'$, however, would disturb the balanced effect of the weight $w$ with respect to the axis at I. Consequently, a mass $$\dfrac{a}{b} \times v'$$

is determined for addition to the end II and 180° from the position of $v'$ to avoid the latter effect. However, the addition of a weight $$\dfrac{a}{b} \times v'$$

to the end II would disturb the effect of $v'$ with respect to the axis at II. Hence, a mass $$\dfrac{c}{d} \times \dfrac{a}{b} \times v'$$

is determined for addition at the position of $v'$. The latter addition would disturb the condition of balance with respect to the axis at I; and, to avoid this, an additional determination $$\dfrac{a}{b} \times \dfrac{c}{d} \times \dfrac{a}{b} \times v'$$

is made for addition to the end II. This process of determination of decreasing weights is continued until the weights become negligible, when the determined amounts for each end are separately added and weights corresponding to the respective sums are added to the respective ends of the rotor at the proper positions. After the amount $v'$ is determined, no further operation of the balancing machine is necessary, since $$\dfrac{a}{b} \times v'; \quad \dfrac{c}{d} \times \dfrac{a}{b} \times v'; \quad \dfrac{a}{b} \times \dfrac{c}{d} \times \dfrac{a}{b} \times v'; \quad \text{etc.}$$

are susceptible of ready computation. For example, assuming that $a=1$; $b=5$; $c=2$; $d=6$; and $v'=15$ ounces, then the weights for each end are:

| End I | End II |
|---|---|
| $\left(\dfrac{c}{d} = \dfrac{1}{3}\right)$ | $\left(\dfrac{a}{b} = \dfrac{1}{5}\right)$ |
| 15.00 | 3.00 |
| 1.00 | .20 |
| .07 | .014 |
| .003 | |
| 16.073 = $v$ | 3.214 = $u$. |

After this process has been carried as far as necessary the exact masses of $v$ and $u$ for addition to the rotor ends are ascertained from the summation of the two series of weights. In the example given, a mass of 16.073 ounces is to be added at the end I and a mass of 3.214 ounces is to be added at the end II and 180° from the location of the mass at the end I.

From the foregoing, it will be apparent that I have devised a method of manipulating balancing masses in connection with a rotor of a balancing machine wherein vibration is allowed to take place at one end at a time, merely by using three weights, the first of which is added to one end of a rotor to eliminate vibration about the other, or fixed end, and the other two of which are added, one at each end of the rotor and 180° apart, so as not to disturb the balanced condition brought about by the first weight and also to bring about a balanced condition of the second end with respect to the vibratory axis at the first end when that end is fixed.

If desired, a single weight may be used instead of separate first and third weights $w$ and $u$. This is indicated diagrammatically in Fig. 3. If vectors are drawn indicating correctly the magnitudes and positions of the masses $w$ and $u$, then the result $r$ correctly represents the magnitude and position of a single weight which will perform the functions of the two weights $w$ and $u$.

It will also be apparent that a rotor balanced according to my process possesses peculiar characteristics, namely, it has two balancing weights in one end and one balancing weight in the other end, the latter balancing weight being larger than and spaced 180° from one of said first two weights. I, therefore, regard, as a part of my invention, a rotor having balancing weights disposed in this way.

While I have indicated in detail several ways by which the principles of my invention may be carried out in practice, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The method of balancing a rotary body having a first and a second plane of vibration and a first and a second balancing plane, all planes being perpendicular to the axis of rotation, the distance from the first balancing plane to the first plane of vibration being $a$, the distance from the second balancing plane to the first plane of vibration being $b$, the distance from the second balancing plane to the second plane of vibration being $c$ and the distance from the second plane of vibration to the first balancing plane being $d$, the method consisting in mounting the body for rotation and for vibration so that each end may move in a single path, restraining the first end of the body against vibration and rotating the body, adding a weight $w$ to the second balancing plane sufficient to eliminate vibration, restraining the second end of the body against vibration and freeing the first end, adding a temporary weight $v'$ to the first balancing plane sufficeint to eliminate vibration at the first end, computing and adding a permanent weight $v$ for the first balancing plane in place of the weight $v'$, computing and adding a compensating weight $u$ to the second balancing plane spaced approximately 180° from the weight $v$, said weight $v$ approximately in mass a result expressed by the formula $$v = \frac{v'd}{\left(d - \frac{ac}{b}\right)},$$

said weight $u$ approximating in mass a result expressed by the formula $$u = \frac{v'd}{\left(\frac{bd}{a} - c\right)}.$$

2. The method of balancing a rotary body having a first and a second plane of vibration and a first and a second balancing plane all planes being perpendicular to the axis of rotation, the distance from the first balancing plane to the first plane of vibration being $a$, the distance from the second balancing plane to the first plane of vibration being $b$, the distance from the second balancing plane to the second plane of vibration being $c$ and the distance from the second plane of vibration to the first balancing plane being $d$, the method consisting in mounting the body for rotation and for vibration so that each end may move in a single path, in restraining the first end of the body against vibration and rotating the body, adding a weight $w$ to the second balancing plane sufficient to eliminate vibration, restraining the second end of the body against vibration and freeing the first end, adding a temporary weight $v'$ to the first balancing plane sufficient to eliminate vibration at the first end, computing and adding a permanent weight $v$ for the first balancing plane in place of the weight $v'$, computing and adding a compensating weight $u$ to the second balancing plane spaced approximately 180° from the weight $v$, the mass of said weight $v$ being determined by the formula $$v = \frac{v'd}{\left(d - \frac{ac}{b}\right)},$$

and the mass of said weight $u$ being determined by the formula $$u = \frac{v'd}{\left(\frac{bd}{a} - c\right)}.$$

In testimony whereof, I have hereunto subscribed my name this 1st day of March 1923.

ROLAND MARSLAND.